United States Patent Office 3,732,291
Patented May 8, 1973

3,732,291
PREPARATION OF FLUOROAMMONIUM SALTS AND THEIR APPLICATIONS
Vytautas Grakauskas, Arcadia, and Allen H. Remanick, Pasadena, Calif., assignors to Aerojet-General Corporation, El Monte, Calif.
No Drawing. Filed Apr. 1, 1969, Ser. No. 812,438
Int. Cl. C07c 143/02
U.S. Cl. 260—513 R     7 Claims

ABSTRACT OF THE DISCLOSURE

This patent describes novel N-fluoroammonium salts having the general formula $$RNH_2F^{\oplus}SO_3Y^{\ominus}$$

wherein R is selected from the group consisting of hydrogen, alkyl, substituted alkyl, cyclic and heterocyclic radicals, and Y is a lower alkyl radical. This patent further describes the method of preparing the above compounds by reacting a compound of the formula

with an alkanesulfonic acid wherein in the above formula R is defined above, and R' is selected from the group consisting of alkyl, alkoxy and amino.

BACKGROUND OF THE INVENTION

The N-fluoroammonium alkanesulfonate salts of the present invention represent a new class of NF compounds. These compounds are useful as oxidizers in solid rocket propellants. These compounds are also useful in the generation of fluoroamines as is more fully described in assignee's copending patent application Ser. No. 812,432, filed Apr. 1, 1969, (AGC Case 1131), the disclosure of which is expressly incorporated herein by reference.

SUMMARY OF THE INVENTION

Briefly, the present invention comprises novel N-fluoroammonium salts having the general formula $$RNH_2F^{\oplus}SO_3Y^{\ominus}$$

wherein R is selected from the group consisting of hydrogen, alkyl, substituted alkyl, cyclic and heterocyclic radicals, and Y is a lower alkyl, typically having up to six carbon atoms, e.g., methyl, ethyl, propyl, butyl and hexyl. This patent further describes the method of preparing the above compounds by reacting a compound of the formula

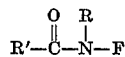

with an alkanesulfonic acid wherein in the above formula R is defined above, and R' is selected from the group consisting of alkyl, alkoxy and amino.

It is an object of the present invention to provide a novel class of N-fluoroammonium alkanesulfonate salts.

Another object of the present invention is the provision of a novel method of preparing N-fluoroammonium alkanesulfonate salts.

Still another object of the present invention is the provision of a novel source of N-fluoroamines.

These and other objects and advantages of this invention will be apparent from the more detailed description which follows.

DESCRIPTION OF PREFERRED EMBODIMENTS

The fluorinated starting material of the present invention may be any N-fluorinated amide, urea or carbamate such as N-fluorourea, ethyl N-fluorocarbamate, propyl N-fluorocarbamate and N-fluorobutyramide. Typically, R contains from 1 to about 12 carbon atoms and is methyl, isopropyl, phenyl, cyclohexyl, decyl, chloromethyl, pyridyl, tolyl, benzyl, biphenylyl, nitromethyl and tertiary butyl.

When R' is alkyl or alkoxy, it also usually contains from about 1 to 12 carbon atoms.

The reaction is preferably carried out at a temperature of from about 0 to 100° C. The product is readily isolated by filtration.

The following examples are presented solely to illustrate the invention.

EXAMPLE 1

A solution of 1.5 g. (0.014 mole) of ethyl N-fluorocarbamate in 6.2 ml. of methanesulfonic acid was heated under nitrogen for 5 hr. at 90 to 94° C. The solution was cooled to room temperature, and ether was added until the mixture became cloudy. After 1 hr., the crystalline product was filtered under nitrogen, washed with ether, and dried under vacuum to give 1.05 g. (57% yield) of white platelets, M.P. 103–105° dec.

Analysis.—Calcd. for $CH_6NSO_3F$ (percent): C, 9.16; H, 4.57; N, 10.7; F, 14.5. Found (percent): C, 9.33; H, 4.77; N, 10.8; F, 14.6.

The infrared spectrum of fluoroammonium methanesulfonate obtained using Fluorolube (2.7.5µ), and Nujol (7.5–16µ) mulls consisted of peaks at 3.0(sh), 3.20(m), 3.30(m), 3.58(w), 6.2–6.6(w), 7.15(m), 7.50(w), 8.05(sh), 8.2–9.6(s), 9.44(s), 9.69(s), 12.4(sh), 12.67 (m), 12.90(w), 13.9(w), and 14.7µ(w).

EXAMPLE 2

Methylfluoroammonium methanesulfonate was prepared by dissolving isopropyl N-fluoro-N-methylcarbamate, 0.1 mole, in 45 ml. of methanesulfonic acid and by heating the resulting solution to 40 to 45° C. until the evolution of carbon dioxide ceased (35 min.).

EXAMPLE 3

Ethylfluoroammonium methanesulfonate solution was prepared from 0.1 mole of isopropyl N-ethyl-N-fluorocarbamate and 50 ml. of methanesulfonic acid following the conditions described in Example 2.

EXAMPLE 4

Fluoroammonium ethanesulfonate solution was prepared by reacting isopropyl N-fluorocarbamate, 0.1 mole, with 70 ml. of ethanesulfonic acid at 45 to 50° C. until the evolution of carbon dioxide ceased (30 min.).

EXAMPLE 5

Methylfluoroammonium ethanesulfonate solution was prepared by heating a solution of 0.1 mole of isopropyl N-fluoro-N-methylcarbamate in 65 ml. of ethanesulfonic acids at 45 to 55° C. until the evolution of carbon dioxide ceased (35 min.).

EXAMPLE 6

Ethylfluoroammonium methanesulfonate solution was prepared by heating a solution of 0.1 mole of N-ethyl-N-fluoroformamide in 65 ml. of methanesulfonic acid at 65 to 70° C. for 2.5 hours.

EXAMPLE 7

A solution of 1.5 g. (0.014 mole) of ethyl-N-fluorocarbamate in 6.2 ml. of methanesulfonic acid was heated under nitrogen for 5 hrs. at 90 to 94° C. The solution was cooled to room temperature, and ether was added until the mixture became cloudy. After 1 hour, the crystalline product was filtered under nitrogen, washed with ether, and dried under vacuum to give 1.05 g. (57% yield) of white platelets, M.P. 103–105° C. dec.

*Analysis.*—Calcd. for $CH_6NSO_3F$ (percent): C, 9.16; H, 4.57; N, 10.7; F, 14.5. Found (percent): C, 9.33; H, 4.77; N, 10.8; F, 14.6.

Fluoroammonium methanesulfonate was obtained in 85% yield by reacting isopropyl N-fluorocarbamate, 0.1 mole, with 60 ml. of methanesulfonic acid at 50 to 55° C. for 1.5 hrs. following the above procedure.

Having fully described the invention it is intended that it be limited only by the lawful scope of the appended claims.

What is claimed is:
1. Novel N-fluoroammonium alkanesulfonate salts having the general formula

$$RNH_2F^{\oplus}SO_3Y^{\ominus}$$

wherein R is hydrogen and Y is a lower alkyl.

2. Fluoroammonium methanesulfonate.

3. The method of preparing novel N-fluoroammonium alkanesulfonate salts which comprises reacting a compound of the formula

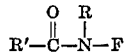

with an alkanesulfonic acid, wherein in the above formula R is hydrogen and R' is selected from the group consisting of amino, alkyl and alkoxy.

4. The method of claim 3 wherein the reaction is carried out in the presence of water.

5. The method of claim 3 wherein R' is amino.

6. The method of claim 3 wherein R' is alkyl.

7. The method of claim 3 wherein R' is alkoxy.

References Cited

Grakauskas et al., J. Am. Chem. Soc. 90:14, 3839–3841 (1968).

DANIEL D. HORWITZ, Primary Examiner

U.S. Cl. X.R.

23—356; 149—19, 109; 260—501.21